May 28, 1968 P. M. LUCAS ET AL 3,385,931

ERROR DETECTING CIRCUITS FOR TELEPHONE REGISTER AND SENDER APPARATUS

Filed Dec. 21, 1964 8 Sheets-Sheet 1

INVENTORS

P.M.LUCAS, J.F. DUQUESNE, J.J. NUTTAL & J-P.L.BERGER

BY

Abraham A. Saffitz

ATTORNEY

INVENTORS
P.M. LUCAS, J.E. DUQUESNE, J.J. NUTTAL & J.P.L. BERGER
BY
Abraham A. Saffitz
ATTORNEY INVENTORS
P.M. LUCAS, J.F. DUQUESNE, J.J. NUTTALL & J.P.L. BERGER
BY
Abraham A. Saffitz
ATTORNEY INVENTORS
P.M. LUCAS, J.F. DUQUESNE, J.J. NUTTALL & J-P.L. BERGER
BY
Abraham A. Saffitz
ATTORNEY

ERROR DETECTING CIRCUITS FOR TELEPHONE REGISTER AND SENDER APPARATUS

INVENTORS
P.M.LUCAS, J.F.DUQUESNE, J.J.NUTTAL & J-P.L.BERGER
BY
Abraham A. Saffitz
ATTORNEY INVENTORS
P.M. LUCAS, J.F. DUQUESNE, J.J. NUTTALL & J-P. L. BERGER
BY
Abraham A. Saffitz
ATTORNEY INVENTORS
P.M. LUCAS, J. F DUQUESNE, J.J. NUTTALL & J.P.L. BERGER
BY
Abraham A. Saffitz
ATTORNEY INVENTORS
P.M. LUCAS, J.F. DUQUESNE, J.J. NUTTAL & J-P. L. BERGER
BY
Abraham A. Saffitz
ATTORNEY 3,385,931
ERROR DETECTING CIRCUITS FOR TELEPHONE REGISTER AND SENDER APPARATUS Pierre M. Lucas, 20 Rue Tariel, Issy-les-Moulineaux, France; Jean F. Duquesne, 41 Rue Esquirol, Paris, France; Jacques J. Nuttal, Rosancan-Plouaret, France; and Jean-Pierre L. Berger, 124 Blvd. Augusta Blanqui, Paris, France Filed Dec. 21, 1964, Ser. No. 419,777
Claims priority, application France, Dec. 24, 1963, 958,443
3 Claims. (Cl. 179—18)

ABSTRACT OF THE DISCLOSURE

Telephone register and sender apparatus comprising a register apparatus registering information data relative to called subscribers and retransmitting said data in a "p-out-of-n" binary code and a sender apparatus receiving said last data and retransmitting them in the form of decimal dialing pulses through outgoing trunk lines. The sender apparatus comprises a plurality N of sender circuits and an access circuit including a sender address register is inserted between the register apparatus and the sender apparatus. The selection of a sender circuit is achieved on a "one-out-of-N" code basis and connection between the register apparatus and one of the sender circuits through the access circuit is controlled by a first code error detecting circuit. The number of dialing pulses sent is expressed in the conventional binary code and a comparator compares the data expressed in the "p-out-of-n" code and represented by the states of $n$ serially connected gates successively with the increasing binary code numbers represented by the states of a number of gates serially connected therebetween and with the preceding gates. The initiation of the decimal dialing pulse transmission is controlled by a second code error detecting circuit and the stopping of said transmission is controlled by the comparator.

The present invention relates to a control system for signalling transmission over trunk telephone lines and more particularly a system of access by a computer containing information relating to the establishment of telephone connections between subscribers or to service conditions, to a pulrality of signalling transmitting members with self programmer, generally called senders.

It is known that certain trunk telephone switching systems comprise senders connected to the outgoing junctors of the outgoing lines of a switching network by means of an individual switching network. This individual switching network temporarily connects the senders to the junctors. A sender serves to send to the junctor to which it is temporarily connected, various signals which the latter retransmits or translates into the form of specific duration pulses or pulse trains over a trunk circuit and comprising, in particular, a trunk-circuit seizing signal TSS adapted to engage an incoming junctor of the switching network of the distant exchange, decimal coded signals enabling the called subscriber's line in the distant exchange to be selected, and a trunk release signal (TRS) adapted to release this trunk circuit. For example, in the case where the signalling is effected in a pulse code for automatic trunk service, the trunk seizing signal (TSS) is a continuous pulse lasting 100 ms., the pulsing or decimal coded signals consist of pulse trains of 50 ms., separated by intervals of 50 ms. comprising one to thirteen pulses, and the trunk release signal (TRS) is a continuous pulse lasting 600 ms.

While these signals are being sent by the sender to the junctor over a connection path through the individual connecting circuit, the sender likewise sends to the junctor, through the same connecting path but over a different wire, what is known as a guard signal which begins 50 ms. before and continues 50 ms. after the continuous pulses or the pulse trains.

The senders in the system of the invention are autonomous program units which, on receiving binary coded information from a computer constituting the centralized source of information in a telephone exchange through an access device, translate this coded information into a program in the course of which one of the signals which the sender is adapted to transmit is effectively transmitted.

The function of the access device according to the invention is to receive from the computer the address of a sender and the information intended for this sender which may concern a number to be transmitted or an order to be executed, to store them temporarily in an address register and an instruction and information store respectively, to check the address of the sender, to transfer the instruction or information received to the designated sender after testing that the latter is free, to check the effective transfer, to check the instruction and information once it has been transferred to the sender, to disconnect itself from the sender, checking the disconnection if the instruction or information transferred to the sender is correct, and to warn the computer by returning the information received to it, if the instruction or information transferred to the sender is not correct. Thus, in short, the access device checks its own operation and only undertakes a fresh phase of its program after having checked the previous one, and in addition it checks the address of the designated sender before connecting itself thereto and the satisfactory termination of the instruction transfer and the accuracy of the instruction transferred to the sender before disconnecting itself therefrom.

Other features and advantages of the invention will be apparent from the following description.

The invention will now be described in detail with reference to the accompanying drawings in which.

Figure 1:
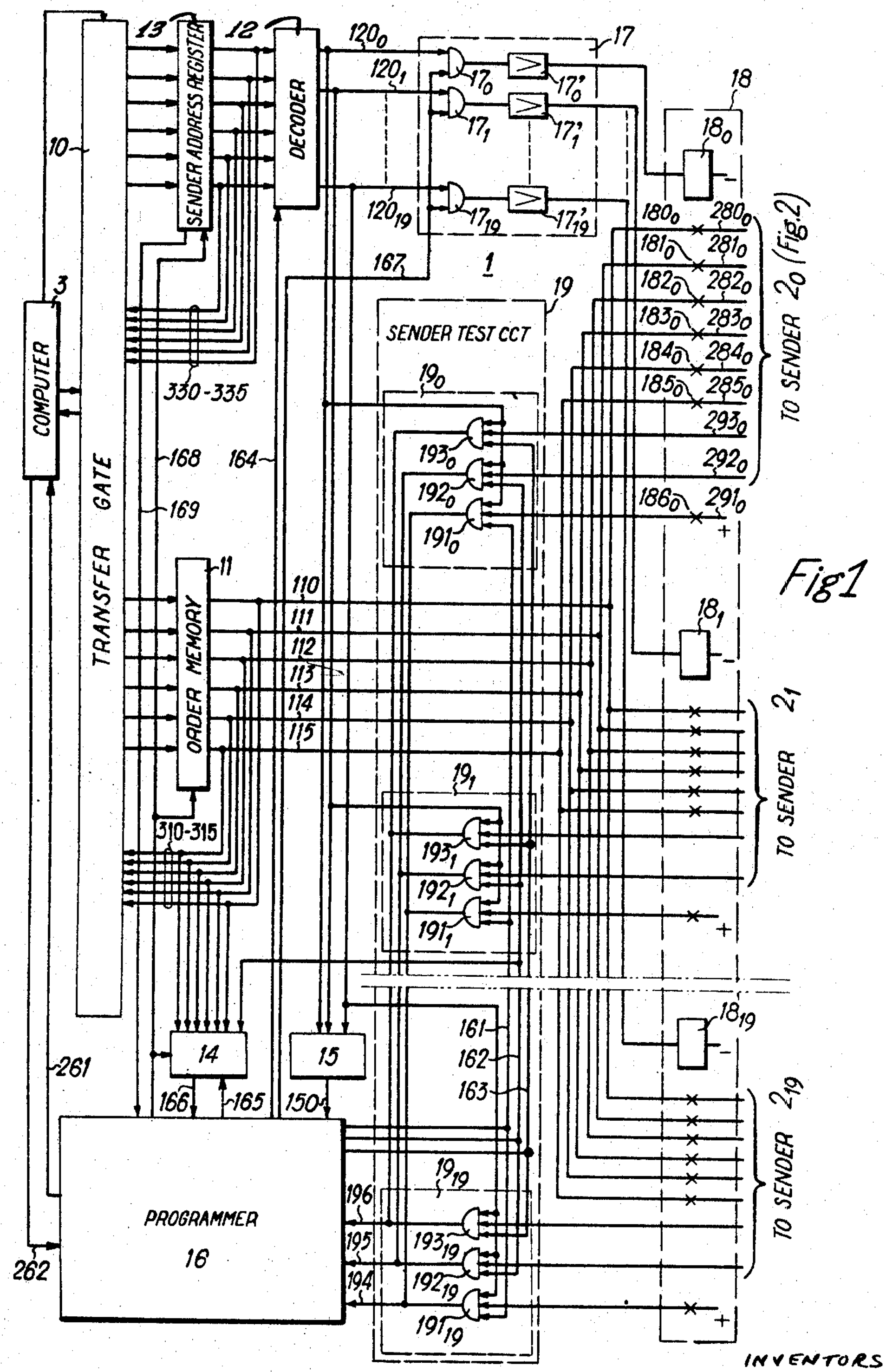
FIGURE 1 is a diagram, partially in the form of a block diagram, of the access device of the invention.
Figure 2:
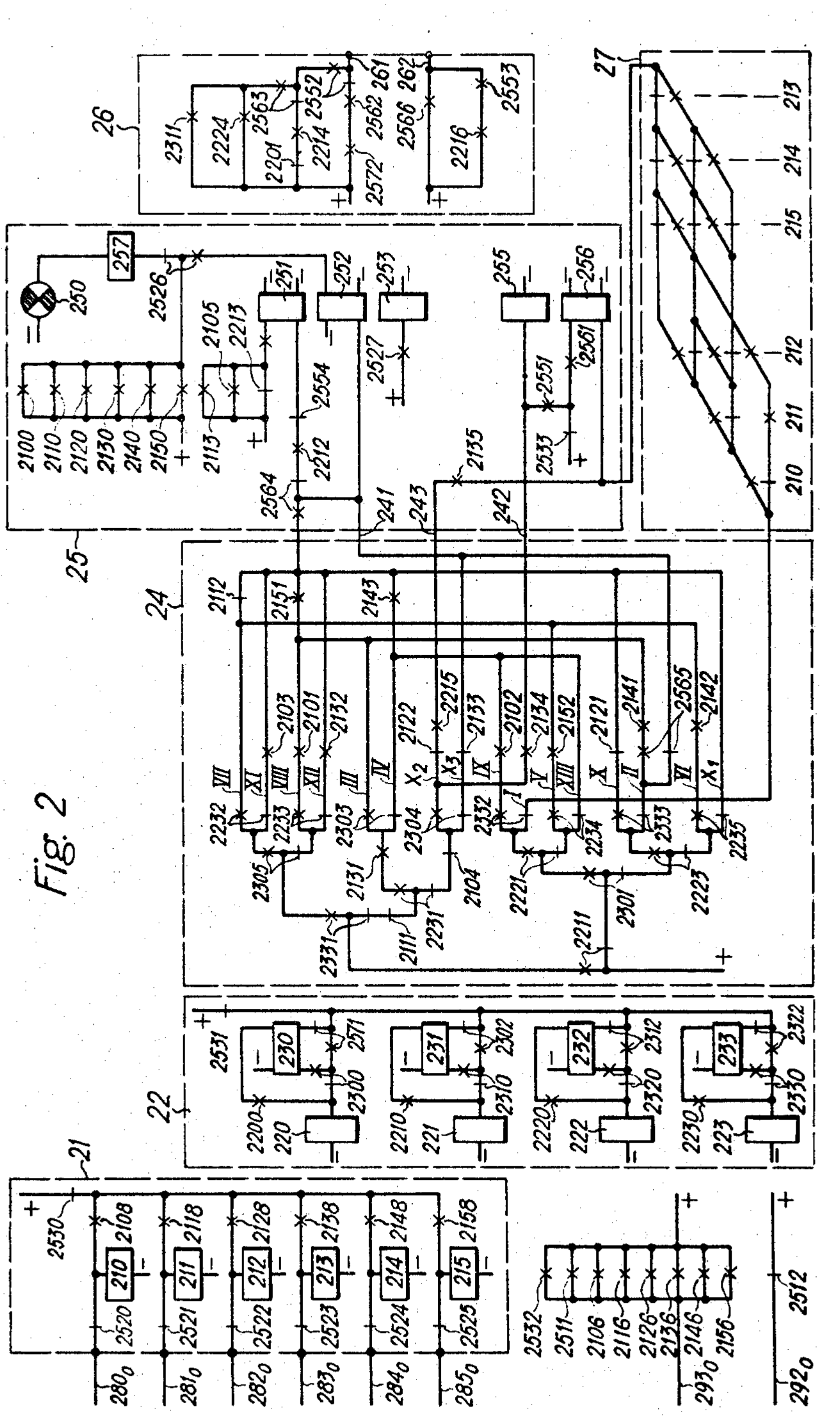
FIGURE 2 shows the detail of the circuits of a sender.

Referring to FIGURE 1, this shows a computer 3 which can have access to twenty senders $\mathbf{2}_0$ to $\mathbf{2}_{19}$, the diagram of which is given in FIGURE 2. The outputs of the senders are connected to junctors by means of a switching network consisting, for example of a crossbar selector, as is known. The access of the computer to the senders is afforded through an access device designated as a whole by the reference numeral 1.

This access device 1 comprises mainly a transfer gate 10, a sender address register 13 associated with a decoder 12, an instruction and information store 11, an address checking circuit 15, a particular instruction detector 14 and a programmer 16. The access device 1 likewise comprises a sender-connecting control circuit 17, a sender-connecting circuit 18 and a sender test circuit 19.

The sender address register 13 is a register comprising six trigger circuits operating in the three-out-of-six binary code, each code combination representing a sender address. The three-out-of-six binary code has twenty combinations, one for each sender. More generally, the p-out-of-n binary code has $n1/p1(n\text{-}p)1$ combinations and *p* and *n* are situated so that the number of combinations be equal to the number of senders or the nearest to, although larger than, the number of senders. It is well known that the three-out-of-six code comprises twenty numbers. This address register 13 is connected to a decoder 12 which, on receiving a binary code in three-out-of six code, converts it into a signal at one and only one output of a group of twenty outputs. The address checking circuit 15 confirms that, on reception of a sender address, there is at least one output terminal of the decoder 12 which is marked and that the marked terminal is unique.

Let $a_0, a_1 \ldots a_{19}$ be the twenty binary digits to be checked and X the "one-out-of-twenty" checking signal. X is a binary digit sent by the address checking circuit 15 to programmer 16 through line 150.

Then: $X = a_0\bar{a}_1\bar{a}_2 \ldots \bar{a}_{19} + \bar{a}_0 a_1 \bar{a}_2 \ldots \bar{a}_{19} + \ldots + \bar{a}_0\bar{a}_1\bar{a}_2 \ldots a_{19}$.

This expression, comprising twenty monomials wherein only one of the $a_i$ has the value 1, is complicated to realise in this form, that is to say in the form of twenty AND gates with nineteen inhibiting inputs and one normal input and of one OR gate. It is preferable to invert it and to write:

$$\bar{X} = Y + Z$$

wherein X is a "zero-out-of-twenty" checking signal $$Y = \bar{a}_0\bar{a}_1\bar{a}_2 \ldots \bar{a}_{19}$$

and Z is a "at-least-two-out-of-twenty" checking signal $$Z = \Sigma a_i a_j \ (i \neq j)$$

This latter signal may itself be deduced from the following intermediate expressions:

$$A = a_0 + a_4 + a_8 + a_{12} + a_{16}$$
$$B = a_1 + a_5 + a_9 + a_{13} + a_{17}$$
$$C = a_2 + a_6 + a_{10} + a_{14} + a_{18}$$
$$D = a_3 + a_7 + a_{11} + a_{15} + a_{19}$$
$$E = a_0 + a_1 + a_2 + a_3$$
$$F = a_4 + a_5 + a_6 + a_7$$
$$G = a_8 + a_9 + a_{10} + a_{11}$$
$$H = a_{12} + a_{13} + a_{14} + a_{15}$$
$$J = a_{16} + a_{17} + a_{18} + a_{19}$$

and this gives:

$$Z = AB + AC + AD + BC + BD + CD + EF + EG + EH + EJ + FG + FH + FJ + GH + GJ + HJ$$

Figure 7:
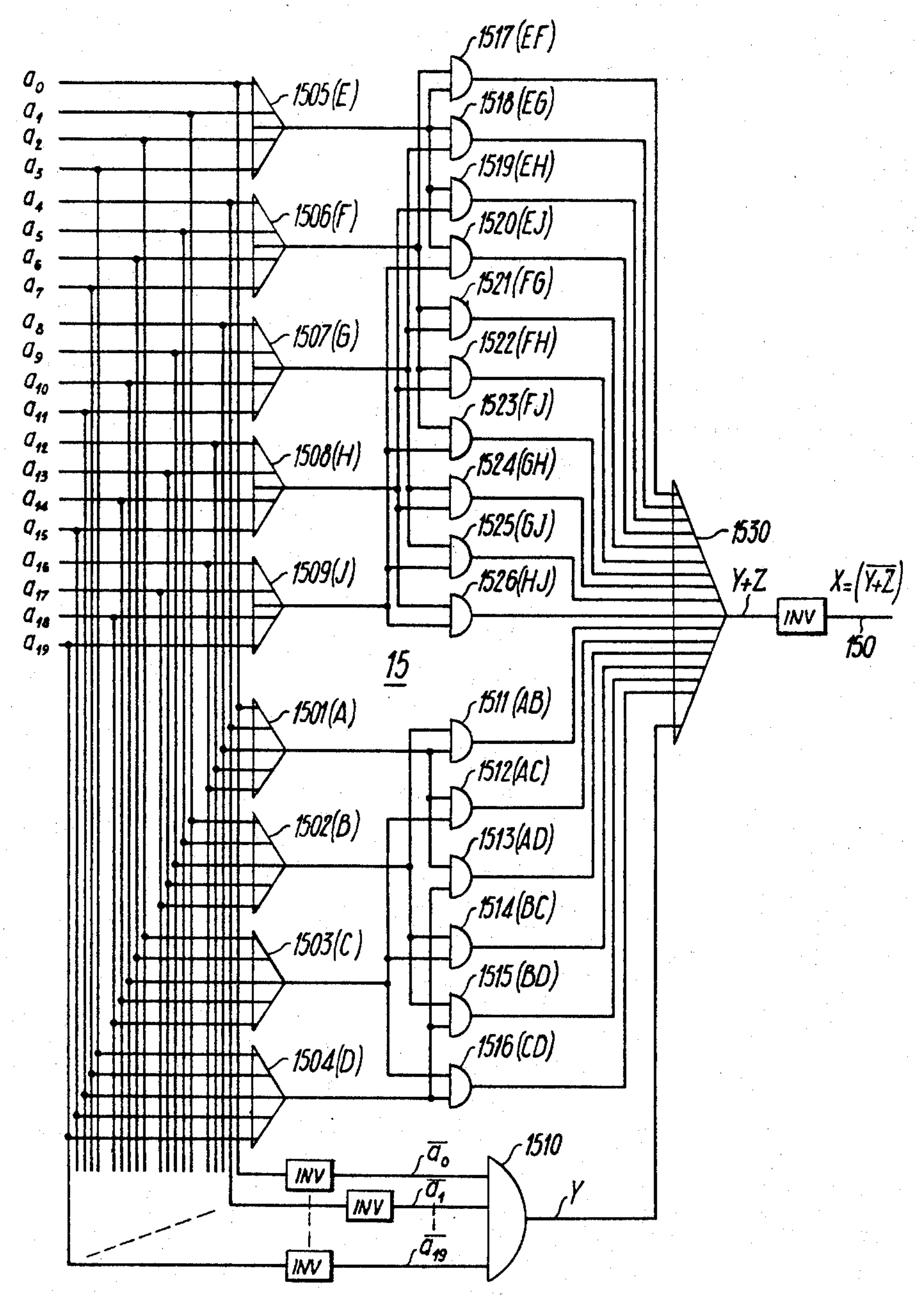
FIGURE 7 represents diagrammatically a one-out-of-twenty code checking device.

The "one-out-of-twenty" code checking circuit 15 which generates the signal $\bar{X}$ can therefore be realised by means of nine OR gates 1501 to 1509 (FIG. 7) with four or five inputs embodying the intermediate functions A to J followed by sixteen AND gates 1511 to 1526 with two inputs embodying the terms of the function Z, one AND gate with twenty inputs 1510 embodying the function Y and an OR gate with seventeen inputs 1530 embodying the function $(Y+Z)$. Inverter circuits labeled "INV" are located where indicated in FIG. 7 in order to transform the $a$ into $\bar{a}$ and $\bar{X}$ into X.

It is easy to see that Z is indeed the function $\Sigma a_i \cdot a_j$ with $(_i \neq _j)$, in effect:

The expansion of Z only contains monomials of the form $a_i \cdot a_j$.

Since ABCD on the one hand, and E F G H J on the other hand comprise different terms $a_i$ and only terms of the group (A B C D) on the one hand and terms of the group (E F G H J) on the other hand are combined together in the expression of Z, there cannot be any term there of the form $a_i a_i$ that is to say all the terms $a_i a_j$ satisfy the condition $(i \neq j)$, All the possible terms $a_i a_j$ (with the restriction $i \neq j$) are in fact obtained by this method because the only terms missing in the products of A B C D two by two, for example, will be those of the form $a_0 \cdot a_4$ or $a_0 \cdot a_5$ or $a_0 \cdot a_8 \ldots$ the two elements of which appear in the same group A for example, but these terms will be found in the products of E F G H J two by two since there they appear in separate groups;

On the other hand it is possible to obtain certain terms twice ($a_0 a_5$ for example) but there is no disadvantage in this because in binary algebra: $a_0 a_5 + a_0 a_5 = a_0 a_5$.

The advantage of having "one-out-of-twenty" checking circuits at the outputs of the decoder 12 is that the transfer circuit 10, the register 13 and the decoder 12 are thus checked simultaneously.

The instruction and information store 11 is a store with six trigger circuits which receives, from the computer 3, signals which are either in conventional binary code or in three-out-of-six binary code. The combinations representing the digits intended to be translated by the sender into the form of decimal sequential pulse trains and comprising in particular the decimal digits of the called subscriber's number are in three-out-of-six code and will be given later. Apart from these numerical combinations representing, in particular the digits of the subscriber's number, the instruction and information store 11 may receive from the computer binary combinations representing service conditions to be obtained, for example the following combinations:

| | |
|---|---|
| Instruction for the compulsory release of the sender (SCR) | 0 0 1 0 1 0 |
| Instruction for the transmission of a trunk circuit seizing pulse (TSS); this pulse lasts 100 ms. | 0 0 1 1 1 0 |
| Instruction for the transmission of a trunk circuit release pulse (TRS); this pulse lasts 600 ms. | 0 0 0 1 0 0 |

It will be seen that these combinations may or may not be in three-out-of-six code.

The particular instruction detector 14 detects the combination representing the instruction (SCR) for the compulsory release of the sender. As for the instructions 0 0 1 1 1 0 and 0 0 0 1 0 0 these are translated by the sender into pulses of 100 and 600 ms. respectively.

The purpose of the programmer 16 is to transfer the instruction received from the computer 3 to the sender, the address of which it receives from the computer at the same time, after having carried out a series of checks and tests, namely; checked the address of the sender, tested the availability of the designated sender, checked that the sender is not faulty, checked the connection of the sender to the access device and checked the entrance of the information to be transferred into the sender store. Once the information has been transfered to the sender, the programmer controls the disconnection of the sender and checks the execution of this disconnection.

Programmer 16 is adapted to define various phases of operation of the access device, that is to say a certain number of different states in which repetitive operations are carried out until an external condition intervenes causing the transition to another phase.

Figure 6:
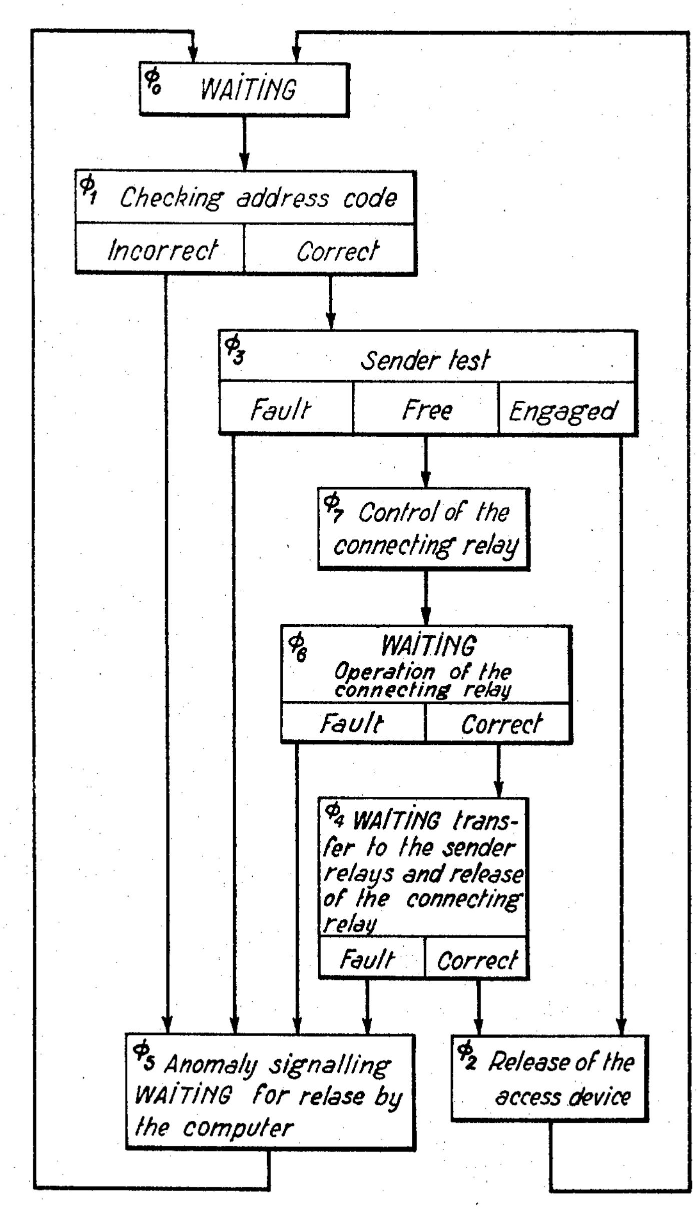
FIGURE 6 is a diagram of the program of the programmer of the access device.

Thus in the example described, the programmer may define eight phases numbered $\Phi_0$ to $\Phi_7$, the logical sequence of which is given in FIGURE 6.

The phase $\Phi_0$ is a waiting phase in which no operation is carried out; this phase is left to pass to $\Phi_1$ as soon as the access device receives an instruction and its address from the computer.

The phase $\Phi_1$ is a transitional phase in which the access device, by means of its "one-out-of-twenty" code checking circuit 15 checks whether a single one of the outputs of the decoder 12 is clearly marked which indicates that the address transfer to the address register 13 and the following decoding have been satisfactorily carried out. There are two possible cases: if the checking is correct, the following phase is phase $\Phi_3$; if not, the following phase is phase $\Phi_5$.

Thus the phase $\Phi_3$ is a transitional phase in which the access device tests the availability of the sender designated by the decoded address and the possible indication of a fault in this sender. Three cases are possible: if the designated sender is free, or exceptionally, if it is faulty but the code of the instruction transmitted by the access device happens to be the compulsory release code (SCR), the following phase is phase $\Phi_7$; if the sender is busy without being faulty, the following phase is phase $\Phi_2$; finally, if the sender is busy and faulty and the code of the instruction transmitted is not that for compulsory release (SCR), the following phase is phase $\Phi_5$.

Phase $\Phi_7$ is a transitional phase in which the operating instruction for the relay for connecting the access device to the sender is given and the starting of a delay; the following phase is phase $\Phi_6$.

Phase $\Phi_6$ is a waiting phase for the connecting relay to come into operation, the duration of this operation being measured by the delay initiated at $\Phi_7$. Two cases are possible: In the normal case, the connecting relay comes into operation within a given time and the programmer passes to phase $\Phi_4$; on the other hand, if, as a result of a fault, the delay comes to an end before the relay has come into action, the following phase is phase $\Phi_5$.

Phase $\Phi_4$ is also a waiting phase. Since the relay for connecting the access device to the sender is operated, the instruction or information can be transferred to the sender store. The confirmation of the filling-in of the sender store enables the programmer to interrupt the energizing of the connecting relay which releases. When the release of this relay is checked by the programmer, there is a passage to phase $\Phi_2$. If, as a result of a fault, the release of this relay has not taken place before the expiration of the delay, the following phase is phase $\Phi_5$.

Phase $\Phi_2$ is a transitional phase in which the various trigger circuits set in the course of the operation of the access device are reset, after which the programmer returns to the waiting phase $\Phi_0$.

Phase $\Phi_5$, to which a return is made whenever an anomaly in operation is found, either in the access device or in the transfer of the instruction or information to the sender, is an indicating phase awaiting clearing. During this phase, the access device merely sends back to its transfer gate 10 the digits on the outputs of its address register and instruction and information store, so that, when the computer, coming to test the state of the transfer gate, finds it in this state, it can take note of the contents of the register and store and so determine the nature of the anomaly and consequently the logical decisions to be reached subsequently, which decisions will not be specified here. When the computer has noted all the indications given by the access device it transmits a general zero-setting instruction thereto which has the effect of causing the programmer to pass from phase $\Phi_5$ to the waiting phase $\Phi_0$.

The operation, phase by phase, will now be described in detail with reference to FIGURE 1.

The access device passes to phase $\Phi_1$ when the computer has transferred an address to the address register 13, the programmer being notified of this by a signal over the wire 169. Means for notifying the filling-in of a register or store are well known in the art and do not need to be described here in detail. The programmer then orders the decoding of the address and the checking of the decoded address. The address of the designated sender (it may be assumed that it is the sender $2_0$) is decoded by the decoder 12 which receives a signal over the wire 164 from the programmer 16 for this purpose. The decoded address is checked by the address checking circuit 15 which, as stated, satisfies itself that there is at least one output terminal of the decoder 12 which is marked and that there is only one such.

If the address checking is satisfactory, the programmer 16 passes to phase $\Phi_3$; if the checking reveals a fault, it passes to phase $\Phi_5$.

The test circuit $19_0$ relating to the sender $2_0$ comprises three gates $191_0$, $192_0$, $193_0$ the outputs of which are connected to the programmer 16 by the wires 194, 195, 196 respectively. One of the inputs of these three gates is connected to the output wire $120_0$ from the decoder 12. The second input of the gate $191_0$ is connected to the programmer by the wire 161 and the third input is connected to a marker potential through the wire $291_0$ and the contact $186_0$ of the relay $18_0$ for connecting the access device to the sender $2_0$. The second input of the gate $192_0$ is connected to the programmer through the wire 162 and the third input is connected to the sender $2_0$ through the wire $292_0$, the presence of a marker potential on this wire indicating that the sender is not faulty. The second input of the gate $193_0$ is connected to the programmer by the wire 163 and the third input is connected to the sender $2_0$ by the wire $293_0$, the presence of a marker potential on this wire indicating that the sender is busy.

During the phase $\Phi_3$, the programmer transmits signals to the gates $192_0$ and $193_0$ through the wires 162 and 163 and a signal to the detector 14 through the wire 165. According to the replies which it receives over the wires 195, 196, 166, it passes to one or other of the following phases:

If the sender $2_0$ is free (no signal over the wire 196) and if it is not faulty (earth over the wire 195) or if it is faulty (no signal over wire 195) and if at the same time, in this latter case, the instruction is that for compulsory release (signal (SCR) over the wire 166), the programmer initiates phase $\Phi_7$ (control of the connecting relay $18_0$).

If the sender $2_0$ is busy (signal over the wire 196), if it is likewise faulty (no signal over the wire 195) and if the instruction is not that for compulsory release (no signal (SCR) over the wire 166), programmer 16 initiates phase $\Phi_5$ (blocking after a fault and waiting for a call from the computer).

Finally, if the sender $2_0$ is busy (signal over the wire 196) but is not faulty (signal over the wire 195), whatever the state of the detector 14, the programmer 16 initiates phase $\Phi_2$ (release of the access device in the case of correct operation).

During phase $\Phi_7$, a signal is transmitted by the programmer 16 over the wire 167 to the gates $17_0$ to $17_{19}$ of the connecting control circuit 17 introduced between the decoder 12 and the connecting relays $18_0$ to $18_{19}$. Since one of the gates, $17_0$ in the case in question, then receives a signal from the decoder 12, this signal passes through the gate, is amplified by the amplifier $17'_0$ and operates the connecting relay $18_0$ for the sender $2_0$. The output wires 110–115 from the instruction and information store 11 are then extended through the make contacts $180_0$ to $185_0$ of the relay $18_0$ towards the sender $2_0$ as far as the relays 210–215 of the instruction and information store 21 of the sender, which causes these relays to be set according to the instruction or information transmitted. As will be explained later, the program of the sender $2_0$ starts.

After the connecting signal for a sender has been transmitted over the wire 167, phase $\Phi_6$ is initiated by the programmer 16 to check the effective connection of the sender that is to say that the connecting relay $18_0$ has worked properly. During this phase, a signal is transmitted by the programmer 16 towards the gates $191_0$ to $191_{19}$ through the wire 161. If the connecting relay $18_0$ for the sender $2_0$ has come into operation during phase $\Phi_7$, a signal is transmitted to the gate $191_0$ through the contact $186_0$ which is operative and the wire $291_0$; this gate opens and a signal is transmitted to the programmer through the wire 194. The following phase is then phase $\Phi_4$ for checking the transfer of the instruction to the store of the sender.

If the relay $18_0$ has not come into operation during phase $\Phi_7$, for example as a result of a transitory disturbance, the gate $191_0$ remains closed and no signal appears over the wire 194. The programmer detects this absence of a signal at the end of a given time lag and initiates phase $\Phi_5$.

During phase $\Phi_4$ which, like phase $\Phi_6$, is a checking phase, the programmer 16 checks that the gate $193_0$ is in fact open which, as will be seen, expresses the fact that the store 21 of the sender is filled-in (potential over the wire $293_0$). For this purpose, it transmits a signal over the wire 163 which passes through the open gate $193_0$ and returns to the programmer through the wire 196. This has the effect of suppressing the signal applied to the wire 167 and consequently of closing the gate $17_0$ and causing the relay $18_0$ to release. The contact $186_0$ becomes inoperative and the gate $191_0$ closes; the signal over the wire 194 is suppressed, which indicates to the programmer that the operation of the access device 1 and that of the sender $2_0$ are both correct.

The following phase is then phase $\Phi_2$ for release in the vent of satisfactory operation.

If in the course of phase $\Phi_4$ the connecting relay $18_0$ does not release, the gate $191_0$ does not close and the signal over the wire 194 remains in existence. At the end of a certain time lag, the programmer then initiates phase $\Phi_5$.

During phase $\Phi_2$, since the access device has fulfilled its purpose appropriately, it is released. For this purpose a signal is transmitted by the programmer over the wire 168 to restore to normal the sender address register 13, the instruction and information store 11 and the compulsory release signal detector 14.

During phase $\Phi_5$, to which a return is made in any case of anomaly, the programmer does not carry out any particular operation and awaits a clearing signal originating from the computer. During all this waiting, an anomaly signal is transmitted to the computer over the wire 261, this signal having been released at the moment of passing to phase $\Phi_5$. On the other hand, the outputs of the address register 13 and of the instruction and information store 11 are accessible to the computer respectively through the return connections 330–335 and 310–315. This enables the latter to know what data have been transmitted back by opening the transfer circuit 10 and to effect a certain number of checks, checking, for example, whether the address of the sender is in fact in three-out-of-six code and whether the address and the instruction are in fact identical with those which were transmitted to the access device.

After the computer, warned by the anomaly signal, has noted this return information and taken the steps prescribed in such a case, which steps will not be given in detail here, it terminates the process by transmitting to the programmer 16, over the wire 262, a zero-setting or release signal, the effect of which is to restore to normal all the trigger circuits in the programmer which are in operation and to cause passage from phase $\Phi_5$ to the waiting phase $\Phi_0$.

The structure of a sender (the sender $2_0$) is illustrated in FIGURE 2.

This sender comprises an instruction and information store 21, to which is transferred the instruction written in the instruction and information store 11 of the access device, and a counter 22 associated with a decoder-comparator 24, the assembly of the counter 22 and decoder-comparator 24 producing successive pulses and stopping when the number of pulses which has been produced and which have been effectively transmitted to the junctor is equal to the number, the code of which is written in the instruction store 11. The sender also comprises its own programmer 25, a signalling transmission circuit 26 and a checking circuit 27.

The instruction store comprises six relays or more generally, six bistable circuits 210–215 which are respectively controlled through the wires $280_0$–$285_0$ coming from the access device and the break contacts $180_0$–$185_0$ of the relay $18_0$ and the break contacts 2520 to 2525 of a relay 252 for releasing the sender. When the store is filled, it is held through make contacts 2108–2158 of the relays 210–215 and a break contact 2530 of an auxiliary release relay 253.

When the instruction coming from the computer 3 through the access device 1 is introduced into the instruction and information store 21, a pulsing relay 257 begins to pulsate as a result of the cam 250 which alternately energizes it and de-energizes it through a path comprising, in parallel, make contacts 2100–2150 of the relays 210–215 and a break contact 2526 of the release relay 252. The pulses are counted by the counter 22 which is here illustrated in the form of a conventional relay counter, 220–230 to 223–233, the pulses to be counted being applied to it by the contact 2571 of the pulsing relay 257. Relay-type binary counters are well known in the art and the operation of such a counter is recalled with reference to FIGURES 3 to 5. The lines *a* to *i* in all these figures indicate respectively the state of the cam 250, of the relays 257, 220 to 223 and 230 to 233. Taking as a period the time $\tau$ (FIG. 3) separating two consecutive attractions of the relay 257, it will be seen that the relay 220 attracts during every odd period and that the attraction times of the relay 230 are staggered by half a period in relation to those of the relay 220, that the relay 221 attracts during two consecutive periods at a frequency $\frac{1}{2}\tau$, the relay 222 during four consecutive periods at a frequency $\frac{1}{4}\tau$ and the relay 223 during eight consecutive periods at a frequency $\frac{1}{8}\tau$, the relays 231, 232 and 233 being respectively in phase quadrature with the relays 221, 222 and 223.

Binary-decimal decoders which enable a single pulse to be obtained at one of a plurality of outputs having a given decimal serial number from simultaneous pulses at a plurality of outputs having binary serial numbers which translate into binary notation the given decimal number are well known in the art and do not need to be described in detail here. On the other hand decoders of the "three-out-of-six"-decimal type which likewise enable a single pulse to be obtained at one of a plurality of outputs having a given decimal serial number from simultaneous pulses at a plurality of outputs having serial numbers in "three-out-of-six" code which translate into "three-out-of-six" notation the given decimal number are also known in the art. The combination of two such decoders and of a comparator delivering a signal when the output having the same decimal serial number is market in the two decoders would therefore render it possible to indicate that the binary combination in the counter 22 is equal to the "three-out-of-six" combination in the store 21.

The decoder-comparator 24 of the invention fulfills the same purpose with a saving in equipment because it combines in one and the same circuit both relay contacts of the counter 22 and relay contacts of the store 21 in such a manner that metallic continuity is only established through said decoder 24 between its input and its output in the event of identity between the codes. In fact for reasons which will be given later, continuity is established not in the event of identity but in the event of the first code representing the following decimal integer than the second code. A pulse is obtained at the output of the decoder-comparator when the counter 22 reaches the number stored in 21 and this pulse is used to stop the pulsing relay 257.

The following table indicates the combinations of the relays of the counter 22 which characterize the sixteen successive signals.

| Signals from counter **22** | Relay combination |
|---|---|
| $X_1$ | $\overline{221}$ x $\overline{230}$ x $\overline{232}$ x $\overline{223}$ |
| $X_2$ | **221** x $\overline{233}$ x $\overline{223}$ x **230** |
| $X_3$ | **221** x $\overline{233}$ x $\overline{223}$ x $\overline{230}$ |
| I | $\overline{221}$ x **230** x **222** x $\overline{233}$ |
| II | $\overline{221}$ x $\overline{230}$ x **222** x $\overline{233}$ |
| III | **221** x $\overline{233}$ x **233** x **230** |
| IV | **221** x $\overline{233}$ x **223** x $\overline{230}$ |
| V | $\overline{221}$ x **230** x $\overline{222}$ x **223** |
| VI | $\overline{221}$ x $\overline{230}$ x $\overline{222}$ x **223** |
| VII | **221** x **233** x **230** x **223** |
| VIII | **221** x **233** x $\overline{230}$ x **223** |
| IX | $\overline{221}$ x **230** x **222** x **233** |
| X | $\overline{221}$ x $\overline{230}$ x **222** x **233** |
| XI | **221** x **233** x **230** x $\overline{223}$ |
| XII | **221** x **233** x $\overline{230}$ x $\overline{223}$ |
| XIII | $\overline{221}$ x **230** x $\overline{222}$ x $\overline{223}$ |

It should be noted that the combinations of the relays of the counter selected to characterise the sixteen wires $X_1$, $X_2$, $X_3$, I to XIII between the input and output of decoder-comparator 24 only comprise four of the eight relays 220–230 to 223–233, namely the two relays 221 and 230 and two other relays carefully selected from 222, 223, 232, 233.

The decoder 24 likewise decodes the instruction written in the instruction store 21 when this instruction corresponds to a numerical combination, the decoding table being as follows:

| Stored decimal numbers | Code in three-out-of-six | | | | | | Decoding |
|---|---|---|---|---|---|---|---|
| | 210 | 211 | 212 | 213 | 214 | 415 | |
| 1 | 1 | 0 | 0 | 0 | (1) | (1) | 214 x 215. |
| 2 | 1 | (0) | 0 | (1) | 0 | (1) | $\overline{211}$ x 213 x 215. |
| 3 | 1 | (0) | 0 | (1) | (1) | 0 | $\overline{211}$ x 213 x 214. |
| 4 | 1 | (0) | 1 | 0 | 0 | (1) | $\overline{211}$ x 215. |
| 5 | 1 | (0) | 1 | 0 | (1) | 0 | $\overline{211}$ x 214. |
| 6 | 1 | (0) | 1 | 1 | 0 | 0 | $\overline{211}$. |
| 7 | (1) | 1 | 0 | 0 | 0 | (1) | 210 x 215. |
| 8 | (1) | 1 | 0 | 0 | (1) | 0 | 210 x 214. |
| 9 | 1 | 1 | (0) | 1 | 0 | 0 | $\overline{212}$. |
| 0 | (1) | 1 | 1 | 0 | 0 | 0 | 210. |
| 11 | 0 | 1 | 1 | (1) | 0 | 0 | 213. |
| 12 | 0 | 1 | 1 | 0 | (1) | 0 | 214. |
| 13 | 0 | 1 | 1 | 0 | 0 | 1 | None. |

Since not all the numbers of the three-out-of-six code are used and, for the decimal digits from 1 to 0 the first digit of the code is always a one, the decoding can be carried out by two-out-of-five. On the other hand, since the comparator carries out the comparisons of the decimal number constituting the instruction and produced by the part of the decoder associated wtih the relays of the store successively with decimal numbers designated by the counter and produced by the part of the decoder associated with the relays of the counter, the decoding of the stored combination can be simplified as the number which constitutes it becomes higher, taking into consideration the fixed order of succession of the combinations produced by the counter relays. For example, the number 7 which is normally written 110001 in the selected three-out-of-six code and the decoding of which should be:

210 x 211 x $\overline{212}$ x $\overline{213}$ x $\overline{214}$ x 215 may be decoded simply by the combination:

210 x 215 because the other numbers comprising the same combination 210 x 215 in their complete decoding combination, namely the numbers 1, 2 and 4 will already have been compared with the number produced by the counter in the course of previous comparisons. In the table giving the codes of the numerical combinations designating the number of pulses to be transmitted, those elements of these numbers which it is sufficient to decode are indicated by placing them in brackets.

Figure 8A:
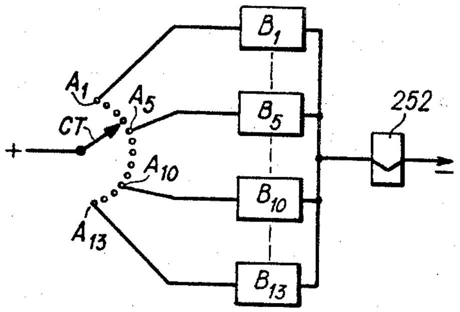
FIGURES 8*a*, 8*b*, 8*c* are sketches for the explanation of the operation of the code changer and comparator included in the sender.

More precisely, the decoding method from the "three-out-of-six" code to the decimal code is the following. Referring to FIG. 8*a*, the counter is shown in the form of a rotating distributor CT with thirteen terminals and the complete decoding circuit in the form of thirteen elementary decoding circuits $B_1$ to $B_{13}$. Theoretically each decoding circuit $B_1$ to $B_{13}$ would have to comprise six contacts, three open and three closed and to be passing when these six contacts are in the state indicated by the column "three-out-of-six" code of the previous table, digit zero corresponding to an open contact and digit one to a closed contact.

The number of contacts can be made lesser than six, at least for some elementary decoding circuits, taking into account the following remark.

Decoding circuit $B_9$ would have to normally comprise the contacts corresponding to the following complete combination:

210 x 211 x $\overline{212}$ x 213 x $\overline{214}$ x $\overline{215}$ and it is desired that it only comprise contacts corresponding to a partial combination extracted from the complete combination.

This partial combination can be a partial combination already used in the decoding circuits $B_1$ to $B_8$ preceding $B_3$ since, distributing CT always rotating the same direction, meets first these decoding circuits and rightly stops on the first of them which is passing.

This partial combination must not be used in the decoding circuits $B_{10}$ to $B_{13}$ following $B_9$ since distributor CT having to rotate up to one of these decoding circuits $B_{10}$ to $B_{13}$ meets first decoding circuit $B_9$ and wrongly stops on it which is passing.

Thus the rule is to replace each given complete combination of the "three-out-of-six" code by a partial combination (i) included in the complete combination and (ii) which does not coincide with other partial combinations corresponding to complete combinations of the code following the given complete combination.

In order to select the simplest partial combination corresponding to a given complete combination, one draws up a table of the differences between the said given complete combination and the other complete combinations which follow it. For example (FIG. 8*b*) the complete combination for 9 reads

110100

Figure 8B:
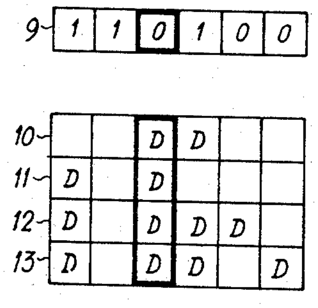

Complete combination for 9 on the one hand and complete combinations for 10, 11, 12, 13 on the other hand differ by the digits of certain binary orders, which is indicated by letter D in the table of FIG. 8*b*. It is thus possible to take as a partial combination for 9, $\overline{\mathbf{212}}$ since the complete combinations for 10, 11, 12, 13 only comprise 212.

As a further example (FIG. 8*c*) the complete combination for 7 reads

110001

Figure 8C:
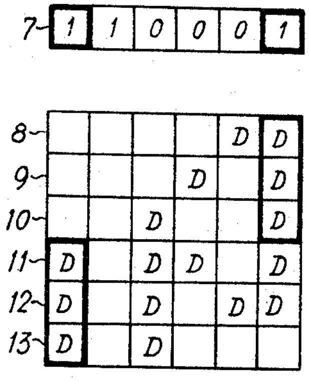

Complete combination for 7 on the one hand and complete combinations for 8, 9, 10, 11, 12, 13 on the other hand differ by the digits of certain binary orders, which is indicated by letter D in the table of FIG. 8*c*. It is thus possible to take as a partial combination for 7, 210 x 215 since the complete combinations for 8, 9, 10, 11, 12, 13 comprise either $\overline{210}$ (combinations for 8, 9, 10, 11, 12) or $\overline{215}$ (combinations 11, 12, 13).

The decoder-comparator effects certain changes and checks during the moments $X_1$, $X_2$, $X_3$. If these checks are satisfactory, it gives the signalling transmission circuit 26 the instruction to begin transmission and to stop the transmission when the number of pulses transmitted becomes equal to or differs by a given amount from the number represented by the numerical combination constituting the instruction received by the sender.

When the counter reaches position I, that is to say before the beginning of the transmission of the called subscriber's number and if the combination of the store relays represents a numerical combination of the "three-out-of-six" code, the start relay 256 is operated through the checking parallelogram 27 and is held through 2561 which is operative and 2533 which is inoperative. This parallelogram is of a well known type. The number of the relay in the instruction and information store 21 to which the contact belongs is written below the contacts. It will be seen that three make contacts and three break contacts are encountered in all the paths between the input and output of the parallelogram. It will be seen furthermore, that the various paths either begin with a make contact of 210 and then comprise two make contacts and three break contacts, which enables the codes of the decimal digits 1 to 0 to be checked, which, in the numerical combination which represents them, comprise a one as the first element and have the following five elements in two-out-of-five code, or begin with a break contact of 210, a make contact of 211 and a made contact of 212 and then comprise a make contact and two break contacts, which enables the codes of the decimal numbers 11 to 13 to be checked which comprise two ones as second and third elements and have the following three elements in one out of three code.

When the start relay 256 has come into operation, the contacts 2562–2563 and 2566 of the signalling transmission circuit 26 close and the transmission begins over the line 261 towards the crossbar switching network connecting sender and junctor. If the start relay 256 has not come into operation at the beginning of the moment II, as the relay 255 is likewise inoperative, then there is a code error and the error relay 251 is operated through the operative contact 2565, the wire 241 and the inoperative contact 2564, operative contact 2212 and inoperative contact 2554. The earth is cut to the wire $\mathbf{292_0}$ by the operative contact 2512 and the earth is confirmed on the wire $\mathbf{293_0}$ through the operative contact 2511. It follows that the fact that the sender is engaged is confirmed by the wire $\mathbf{293_0}$ and that it is shown to be faulty by the wire $\mathbf{292_0}$.

In order to return the error relay 251 to normal, it is later necessary to give the sender the compulsory release instruction (SCR). This instruction is received in the instruction and information store 21 (relays 212 and 214 operative, all the others inoperative; with reference to the previous decoding table it will be seen that this compulsory release instruction (SCR) can be characterised by 210 and 211 both inoperative) and decoded in the decoder-comparator 24. The pulsing relay 257 begins to pulsate as before and having reached the moment $X_2$, the relays 210, 211 are inoperative (reception of the compulsory release signal) and the relay 221 is operative (moment $X_2$); it follows that the holding circuit of the relay 251 which comprises the operative contact 2105, operative contact 2113 and inoperative contact 2213 in parallel is opened. The error relay 251 therefore releases. The stop relay 252 is then energized at the moment $X_3$ (relays 210, 211 and 213 inoperative) through inoperative contact 2111, inoperative contact 2104, inoperative contact 2133 and the wire 241). It holds itself through its make contact 2526 and the contacts 2120 and 2140 in parallel. When the stop relay 252 comes into operation, the circuit of the pulsing relay 257 is interrupted at the operative contact 2526 and the pulsing relay stops pulsating, separates the instruction and information store 21 of the sender from the instruction and information store 11 of the access device at the operative contacts 2520–2525, and operates the auxiliary relay 253 through operative contact 2527. On coming into operation, the relay 253 zeroizes the instruction and information store 21 through operative contact 2530, which can be done without the semiconductor devices constituting the instruction register 11 running the risk of suffering from overvoltages occurring on the interruption of the circuits of the relays 210 to 215 since they are isolated by the opening of the contacts 2520–2525. The relay 253 resets the counter 22 through operative contact 2531. It likewise resets the relays of the programmer 25. When the relay 253 releases through inoperative contact 2527, it again indicates availability, through inoperative contact 2532, over the line $\mathbf{293_0}$, to which the earth is cut.

Figure 3:
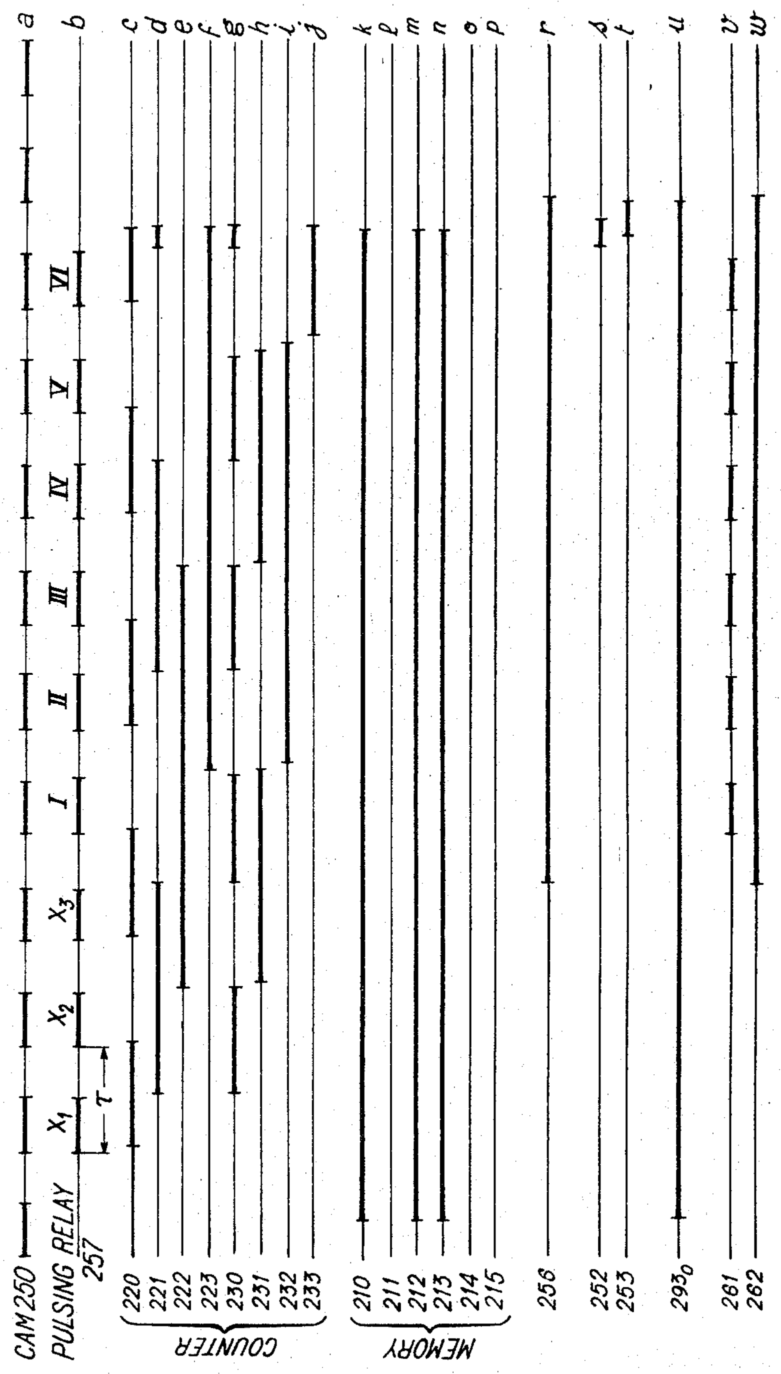
FIGURES 3, 4 and 5 are signal diagrams showing the operation of the sender.

FIGURE 3 illustrates, in lines *l* to *w* the state, in the absence of a fault, of the relays 210–215 of the instruction and information store 21 in the case where the numerical combination corresponds to the instruction for transmission of the digit 6, of the start relay 256, the stop relay 252, the auxiliary release relay 253, the busy wire $\mathbf{293_0}$, the transmission wire 261 and the guard wire 262. Line *v* shows that six pulses are transmitted over the wire 261 and that a long continuous spanning pulse which exceeds the total duration of the six dialling pulses by the duration of one dialling pulse before and after, is transmitted over the wire 262, as is usual in trunk switching.

The spanning signal, transmitted over the guard wire 262 which is connected to an appropriate control in the junctor of the trunk renders it possible, particularly in the case where the junctor uses voice-frequency signalling, to avoid disturbances in the ringers of the circuit for the duration of the transmission of the signals by temporarily isolating from the junctor the line wires at the automatic switch side, which are a possible source of disturbing noises.

Apart from the dialling pulses corresponding to the numerical combinations of the code, the sender can send to the junctor, as already stated, a continuous signal of a certain duration (for example 100 ms.) for the seizure of the trunk circuit, the code for which is 001110 and a continuous signal of long duration (for example 600 ms.) for the release of said trunk circuit, the code for which is 000100.

Figure 4:
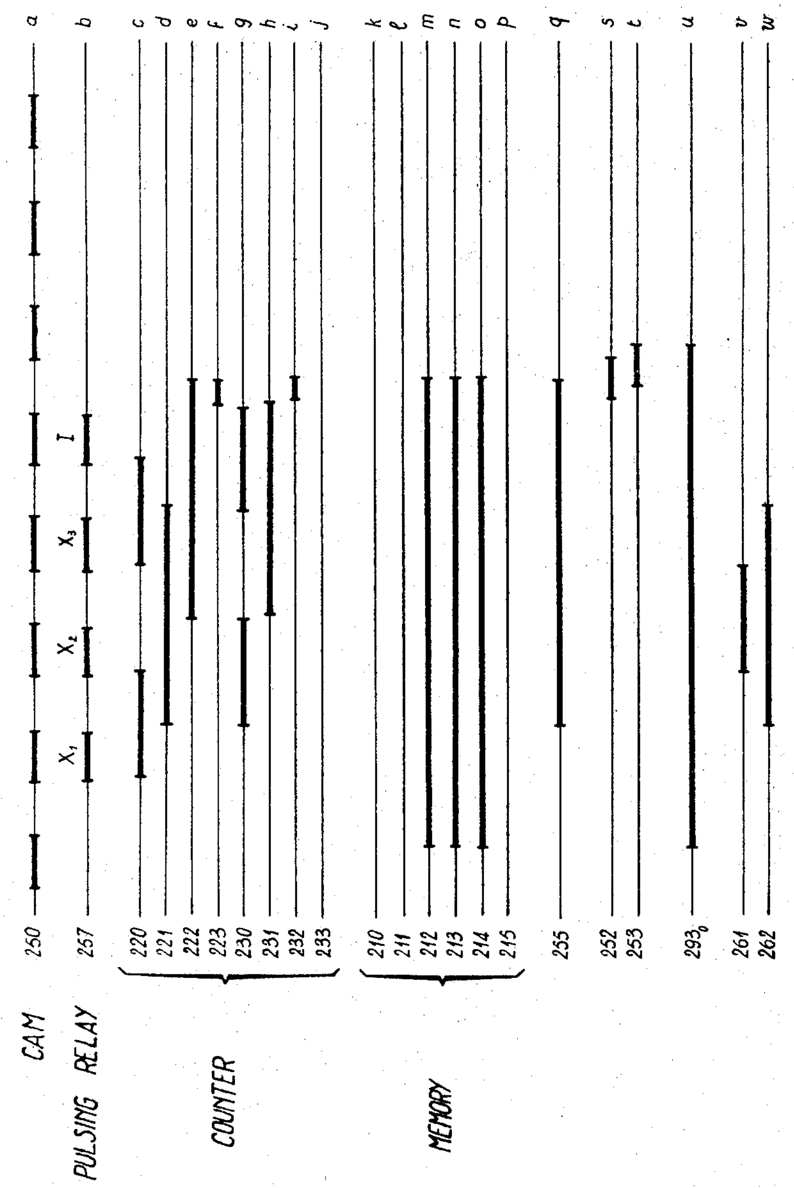
Figure 5:
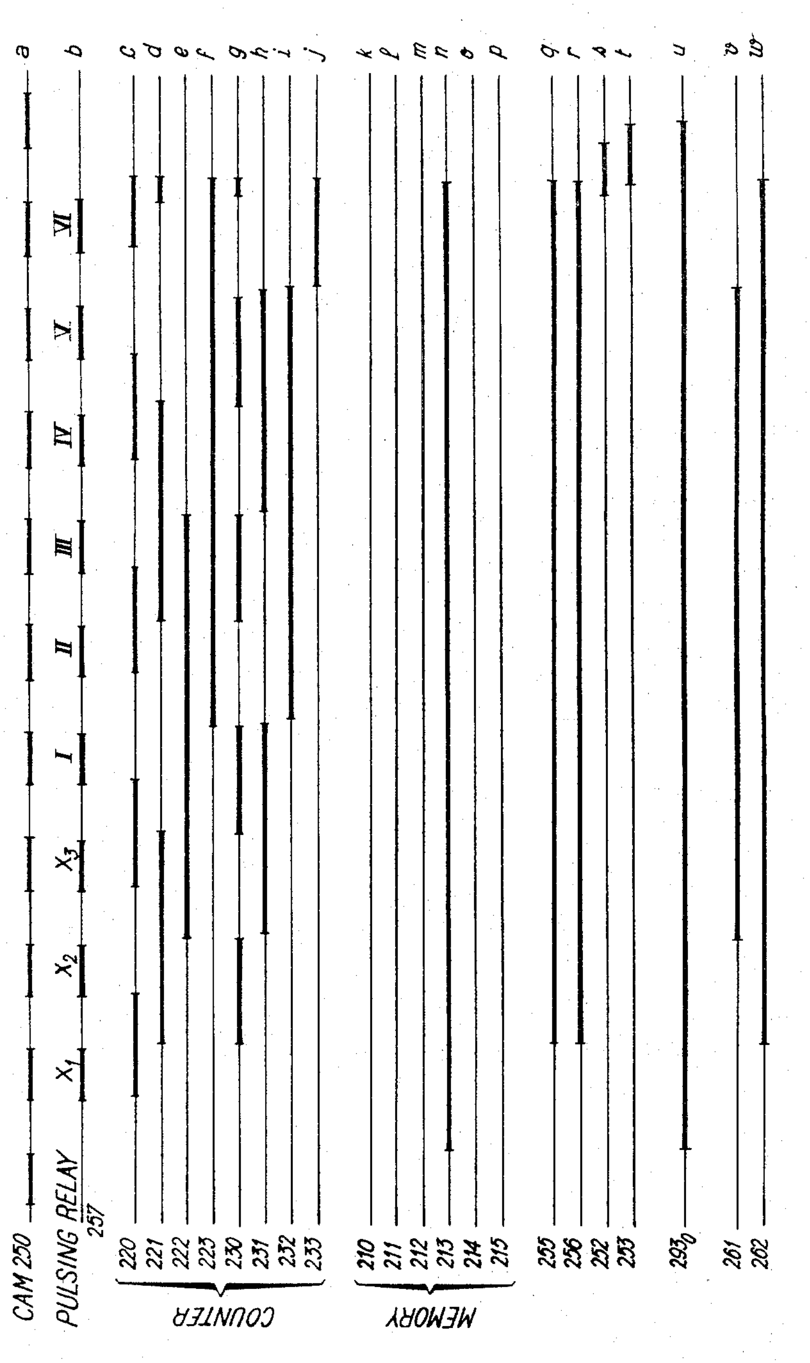

In the case of the junctor seizing signal (001110) (FIGURE 4), the relay 255 is energized at the moment $X_2$ through 2111 inoperative, 2104 inoperative, 2134 operative and the wire 242 and is held through 2551 operative and 2533 inoperative. A signal is then transmitted over the line 261 through 2201 inoperative, 2214 operative, 2563 inoperative and 2552 operative. Referring to FIGURE 4, it will be seen that the condition $\overline{220}$ x 221 causes the transmission to last from the beginning of the moment $X_2$ to the beginning of the moment $X_3$. Since the code for the junctor seizing signal is not a numerical code, the relay 256 remains inoperative at the beginning of the moment I but the transmission is interrupted at the beginning of the time $X_3$ by 2201 operative. The stop relay 252 is energized at the beginning of the time II through 2565 inoperative and the wire 241 which restores the counter 22 to zero. A guard signal is transmitted over the line 262 through the contact 2216 operative and 2553 operative; it extends beyond the signal on the line 261 both at the front and at the rear.

In the case of the switching-network release signal (0001000) (FIGURE 5), the relay 255 is energized at the moment $X_2$ through 2111 inoperative, 2104 inoperative, 2134 operative and the wire 242 and is held through 2551 operative and 2533 inoperative. The start relay 256 is likewise energized at the moment $X_2$ through 2111 inoperative, 2104 inoperative, 2122 inoperative, 2215 operative, the wire 243 and 2135 operative. From the beginning of the moment $X_2$, therefore, the relays 255 and 256 are both operative. A signal is then transmitted over the line 261 during the period when either the relay 222 or the relay 231 is operative, through the make contacts 2224 or 2311 and the contacts 2563 operative and 2552 operative. It will be seen that the duration of this signal is about 600 ms. A guard signal is transmitted over the line 262 through the contact 2566 operative; it extends beyond the signal on the line 261 both at the front and at the rear. When the counter is in position VII, the release relay 252 is energized through 2112 inoperative and 2564 operative and the relays 255 and 256 release.

Since many changes could be made in the above construction and many apparently widely different embodiments of this invention could be made without departing from the scope theerof, it is intended that all matter contained in the above description or shown in the accompanying drawing shall be interpreted as illustrative and not in a limiting sense. Particularly, the relay contacts in comparator 24 in FIG. 2 can be replaced by gates controlled by the stages of the store 21 and the stages of the counter, those contacts which are closed in the case where the stage contains a one being replaced by conventional gates and those contacts which are closed in the case where the stage contains a zero being replaced by inhibition gates.

What we claim is:

1. In a telephone switching system having outgoing trunk lines and including register apparatus for registering information data relative to called subscribers and for retransmitting said data in a "p-out-of-n" binary code, and sender apparatus for receiving said "p-out-of-n" code data and for retransmitting said code data through said outgoing trunk lines in the form of decimal dialing pulses a plurality of senders each comprising store means for storing the "p-out-of-n" code combination, said store means including *n* first binary circuits for storing said "p-out-of-n" code combination, a pulse generator for sending through said trunk lines dialling pulse sequences in a decimal code, the combinations of the "p-out-of-n" code respectively corresponding to the successive numbers of the decimal code, counter means connected to said pulse generator for counting the number of dialling pulses in a sequence, said counter means including second binary circuits for storing said dialling pulse number in a binary code, means controlled by said store means for initiating said pulse generator, comparator means including a plurality of chains of serially connected gates, *n* of which being respectively associated with the *n* first binary circuits of the store means and controlled thereby and the remainder of which being respectively associated with the second binary circuits of the counter means and controlled thereby, whereby a given gate chain is closed when the number of dialling pulses in the decimal code is equal to the corresponding combination in the "p-out-of-n" code, means controlled by said comparator means for stopping said pulse generator, a "p-out-of-n" code error detecting means associated with said store means, an access circuit for selectively connecting said register apparatus and sender apparatus to said senders and means for controlling said access circuit by said error detecting means.

2. In a telephone switching system having outgoing trunk lines and including register apparatus for registering information data relative to called subscribers and for retransmitting said data in a "p-out-of-n" binary code, and sender apparatus for receiving said "p-out-of-n" code data and for retransmitting said code data through said outgoing trunk lines in the form of decimal dialling pulses a plurality of N senders each comprising a first store means for storing the "p-out-of-n" code combinations, said first store means including *n* first binary circuits for "p-out-of-n" code combinations, a pulse generator for sending through said trunk lines dialling pulse sequences in a decimal code, the combinations of the "p-out-of-n" code respectively corresponding to the successive numbers of the decimal code, counter means connected to said pulse generator for counting the number of dialling pulses in a sequence, said counter means including second binary circuits for storing said dialling pulse number in a binary code, means controlled by said store means for initiating said pulse generator, comparator means including a plurality of chains of serially connected gates, *n* of which being respectively associated with the *n* first binary circuits of the first store means and controlled thereby and the remainder of which being respectively associated with the second binary circuits of the counter means and controlled thereby, whereby a given gate chain is closed when the number of dialling pulses in the decimal code is equal to the corresponding combination in the "p-out-of-n" code, means controlled by said comparator means for stopping said pulse generator, a first "p-out-of-n" code error detecting means associated with said first store means, means responsive to the entry of data into said first store means, an access circuit comprising a sender address register, a second "one-out-of-N" code error detecting means associated with said address register, a second store means for storing the "p-out-of-n" combinations and for transferring them to said first store means, means for selectively connecting together said first and second store means and means for controlling said access circuit by at the same time said first error detecting means, said second error detecting means and said data entry responsive means.

3. In a telephone switching system having outgoing trunk lines and including register apparatus for registering information data relative to called subscribers and for retransmitting said data in a "p-out-of-n" binary code and sender apparatus for receiving said "p-out-of-n" code data and for retransmitting said code data through said outgoing trunk lines in the form of decimal dialing pulses, a plurality of senders according to claim 1 in which the store means of each sender includes six first binary circuits numbered (I) to (VI), the counter means of each sender includes four second binary circuits and the comparator means includes thirteen chains numbered 1–13 of serially connected gates, each chain comprising a number smaller than six of serially connected first gates according to the following table:

| Number of the chain | Designation of the gates |
|---|---|
| 1 | V, VI |
| 2 | $\overline{II}$, IV, VI |
| 3 | $\overline{II}$, IV, V |
| 4 | $\overline{II}$, VI |
| 5 | $\overline{II}$ |
| 6 | I,VI |
| 7 | I, V |
| 8 | $\overline{III}$ |
| 9 | I |
| 10 | IV |
| 11 | V |
| 12 | nil |

where I to VI designate gates respectively associated with binary circuits (I) to (VI) and passing when said circuits are in the one state and $\overline{I}$ to $\overline{VI}$ designate the same gates but passing when said stages are in the zero states, and further four second gates serially connected with said first gates, respectively associated with the first four binary circuits of the counter means, the first gates inserted in series in a given chain corresponding to a given decimal number being all passing in the case where the store means has written therein the translation of said decimal number into the "three-out-of-six" code and the four gates inserted in series in the same given chain being all passing in the case where the counter means has written therein the translation of said decimal number into the binary code.

References Cited

UNITED STATES PATENTS

| | | | |
|---|---|---|---|
| 3,024,315 | 3/1961 | Faulkner | 179—18 |
| 3,301,963 | 1/1967 | Lee et al. | 179—18 |

KATHLEEN H. CLAFFY, *Primary Examiner.*

LAWRENCE WRIGHT, *Examiner.*